Oct. 18, 1960     E. M. KANE     2,956,401
VARIABLE THRUST ROCKET MOTOR
Filed June 12, 1959
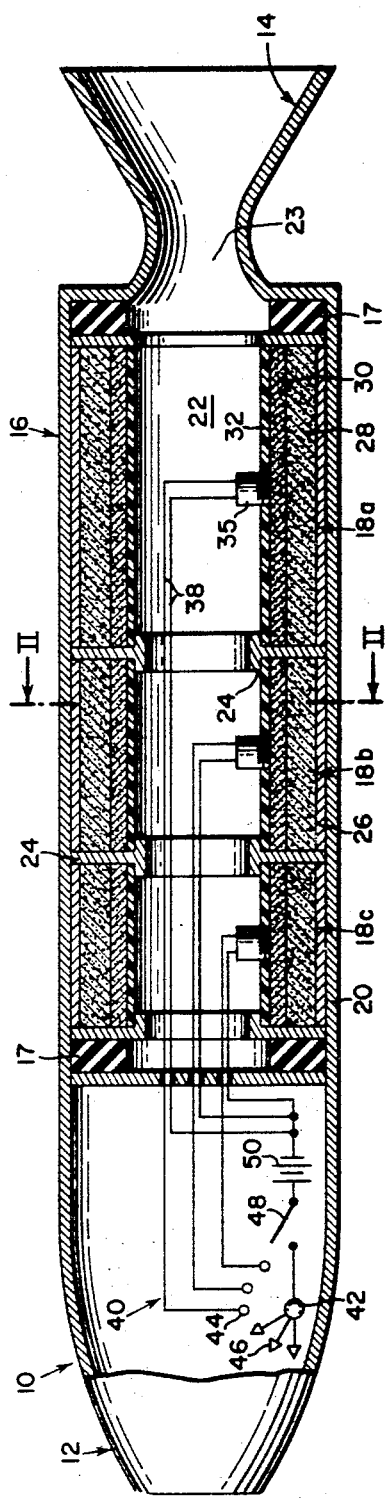
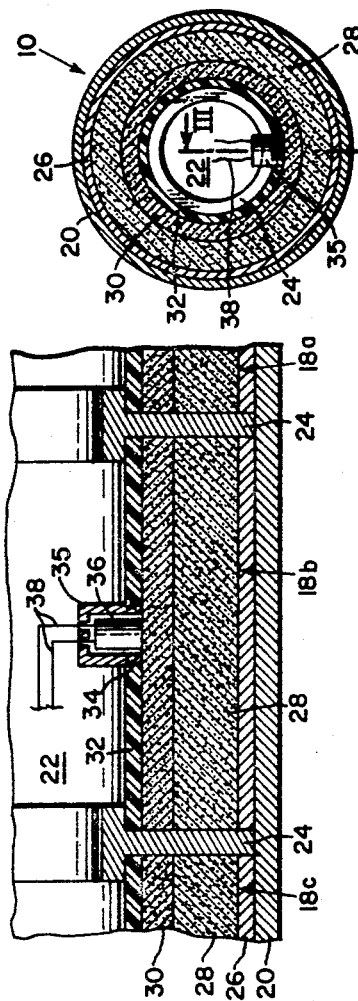
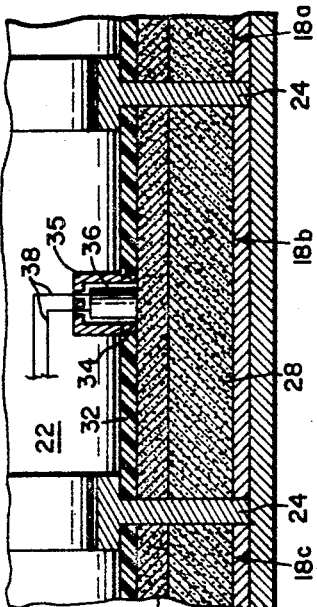
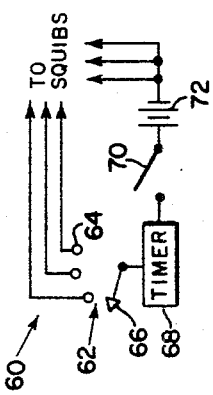
INVENTOR.
ERNEST M. KANE
BY F. J. Schmitt
George J. Lubens
ATTORNEYS

United States Patent Office 2,956,401
Patented Oct. 18, 1960

2,956,401

VARIABLE THRUST ROCKET MOTOR

Ernest M. Kane, Oxnard, Calif.

Filed June 12, 1959, Ser. No. 819,783

8 Claims. (Cl. 60—35.6)

(Granted under Title 35, U.S. Code (1952), sec. 266)

This invention described herein may be manufactured and used by or for the Government of the United States of America for governmental purposes without the payment of any royalties thereon or therefor.

This invention relates to rocket motors and more particularly to solid propellant rocket motors, the thrust and impulse of which can be variably preset for adapting to various requirements, such as changing missile range.

Since the advent of artillery, the conventional manner of varying the range of projectiles has been to change the elevation of the cannon or the like, and, accordingly, the trajectory of the projectile.

Of necessity, this same method has been adapted for present day missiles employing solid propellant rocket motors which contained a single fixed charge. No effective solid propellant rocket motor has been devised to vary selected portions of the propellant charge to be ignited depending on the missile range desired. The only prior method of varying the thrust of solid propellant motors has relied on temperature conditioning of the propellant which has proved time consuming and did not allow appreciable adjustment of total impulse. This problem is not prevalent in liquid propelled rocket motors since the nature of the propellant offers a simple manner of controlling thrust by controlling the flow rate of liquid fuel admitted to the combustion chamber.

Another condition that may dictate the need for a variable thrust solid propellant motor is to impart to a missile periodic bursts of acceleration. A missile may be designed with intermittent periods of acceleration alternated with glide periods to avoid excessive speeds and the resulting heating effects that the missile may otherwise experience.

A dual range rocket has been described in U.S. Patent 2,856,851, issued on October 21, 1958, to H. E. Thomas. In this patent, the dual range is achieved, in effect, by providing two separate and complete rocket motors in a single casing, the respective exhaust nozzles being on opposite ends of the casing. Each motor has a different size propellant charge with an impervious wall therebetween. The rocket warhead is threadedly attached to either end of the casing depending on the particular rocket motor to be used, one being for anti-personnel and the other being for antitank targets.

The patented rocket is limited to a dual range artillery projectile since the casing has only two ends. It is apparent that such a construction would not be suitable, nor has the versatility required, for example, in an air-to-air missile where the target range may change during flight of the missile launching aircraft. Such an environment does not permit a manual reassembly of the missile as is required in the patented device. The prior art device is not capable for a multi-range condition, nor for intermittent rocket acceleration.

The present invention provides a solid propellant rocket motor having a plurality of individual solid propellant sections which can be fired jointly or separately in a preset sequence, the control capable of being at a remote station. The propellant sections have individual ignition means connected in a circuit employing a selector switch for selecting the number and sequence of the propellant charges to be ignited. Means are provided for isolating the propellant sections from the ignition effects of adjacent sections.

A principal object of this invention is to provide a solid propellant motor, the thrust of which can be adjusted to a desired value before firing; and a corollary object is to control said selection from a remote station.

Another object is to provide a solid propellant motor comprising a plurality of independent propellant sections each having an ignition means connected in a common circuit.

Other objects and many of the attendant advantages of this invention will be readily appreciated as the same becomes better understood by reference to the following detailed description when considered in connection with the accompanying drawings wherein:

Fig. 1 is a longitudinal cross-sectional view of a missile showing the novel solid propellant rocket motor and ignition circuit;

Fig. 2 is a transverse section through the solid propellant motor taken along line II—II of Fig. 1;

Fig. 3 is an enlarged complete cross-sectional view of one of the solid propellant sections taken along line III—III of Fig. 2; and Fig. 4 is a modification of the control circuit.

Referring to the drawing where like reference numerals refer to similar parts through the drawing, Fig. 1 shows a conventional guided missile 10 generally comprising a warhead 12, a nozzle 14, and a novel intermediate solid propellant rocket motor 16, the details presently to be described. The ends of the rocket motor are supported within the missile casing by compression pads 17.

Rocket motor 16 comprises a plurality of annular sections 18a, 18b, and 18c, snugly mounted within the missile casing 20 and longitudinally disposed in contiguous relation. Contiguous hollow cores 22 of the composite sections form an extension of a combustion chamber 23. For purposes of illustration, motor 16 consists of three propellant sections, however, the number and size may vary depending on the individual requirements of each missile. Usually the first section 18a adjacent the nozzle will contain a larger charge, as illustrated, to impart the necessary acceleration for the launch phase. The construction of each propellant section may be substantially identical and the description of one section should suffice for all sections.

Each propellant section is formed between a respective pair of annular T-ring separators 24, constructed of steel, aluminum, plastic, or the like, which may be secured at the stem portion to the inside wall surface of the missile casing in any conventional manner. However, as a practical matter to facilitate assembly and loading of the propellant section simply and to avoid welding operations to ensure a maximum degree of safety, the separators are maintained in fixed relation by a plurality of spacer sleeves 26 slidably fitting against the inside casing wall to abut the respective T-ring separators. The crossbar portions of the respective T-rings serve as supplemental means to isolate the propellant sections and prevent the jumping of the flame from one section to another, and also to restrain the inhibiting layer from being displaced.

An annular ring of a conventional propellant material 28 is pressed or otherwise applied between the T-ring separators and adjacent spacer sleeve 26. The propellant sections can be assembled from the innermost propellant section and working outwardly, one section at a time. A layer of ignition compound 30 is applied over the exposed bore surface of the propellant ring to facilitate ignition thereof. A suitable ignition compound for pressing the compound in position, i.e., by a mechanical die, consists of 10% magnesium, 82% barium oxide, and 8% Thiokol (LP–2) without a catalyst. As an alternative, the ignition compound can be made into a paste consistency by adding a sufficient quantity of Thiokol, and applied to the propellant ring by spreading or by centrifugal casting.

A protective layer of inhibiting material 32 is applied over ignition layer 30 to prevent accidental ignition of layer 30 by the flame created from the ignition of adjacent propellant sections. Protective layer 32 is preferably made of a plastic material which can be threaded at 34 for the attachment of a squib case 35 housing an electrical squib 36. Squib 36 is in contact with the ignition mixture. Each squib has a pair of electrical conductors 38 which are suitably connected to a control circuit 40 whereby the firing sequence of the propellant sections can be selected in advance. Conductors 38 can be thermally insulated and secured along the motor bore, or otherwise located depending on the details of missile construction. Since ignition of the propellant occurs from the nozzle inwardly, or simultaneously, the conductors of a particular propellant section will not be damaged by the firing of a forward section prior to its own ignition.

Control circuit 40 comprises a selector switch 42 having a plurality of contacts 44 each connected to a corresponding conductor from each squib. Accordingly, switch 42 has three contacts 44, one for each of the respective propellant sections illustrated. In the modification shown in Fig. 1, switch 42 has a corresponding number of radially projecting switch arms 46, one for each of the contacts and the squibs connected thereto. Arms 46 may be manually positioned, or automatically positioned from a remote station, to engage and energize the necessary number of contacts depending on the total number of propellant increments to be fired simultaneously. The switch arms are electrically connected in series to one side of a main ignition switch 48 which also can be actuated from a remote station, i.e., launching aircraft by any conventional means. The other side of ignition switch 48 is connected to one side of an electrical power supply, i.e., D.C. battery 50, the other side of the battery being connected jointly to the remaining conductors from squibs 36 to complete the control circuit.

Fig. 4 illustrates another modification of the control circuit 60 wherein the propellant increments can be fired at timed intervals, creating intermittent missile glide periods. Control switch 62 has three contacts 64 adapted to be engaged successively by a single arm 66 periodically actuated by a timer 68. Circuit 60 also includes a main ignition switch 70, and a power source 72 connected to squibs 36, similar to the control circuit in Fig. 1.

Operation of the novel rocket motor is apparent from the drawing. Employing the control circuit of Fig. 1, depending on the missile range to be obtained, switch arms are manually or otherwise rotated to engage the contacts of propellant increments selected to be fired. All of the propellant increments selected through switch 42 in this modification will be fired simultaneously, the remaining increments, if any, will remain unfired.

In the event that a successive firing of the various propellant increments is desired to impart intermittent boost phases to the missile, the control circuit of Fig. 4 may be employed. In this modification timer 68 advances the single contact arm 66 successively to engage each contact according to any preset time intervals.

The present invention provides a simple and inexpensive solid propellant motor having a plurality of propellant increments, the performance of which can be varied by preselecting the increments to be energized, depending on missile requirements. The missile components can be assembled in a safe and expedient manner. In one modification of the control circuit, one or more of the propellant increments can be selected for firing simultaneously to propel the missile over a corresponding range. In another modification of the control circuit, the increments may be fired successively to provide to the missile with intermittent thrust and glide stages.

Obviously many modifications and variations of the present invention are possible in the light of the above teachings. It is therefore to be understood that within the scope of the appended claims the invention may be practiced otherwise than as specifically described.

I claim:

1. A variable-thrust solid propellant motor comprising an outer casing, a plurality of separate propellant increments disposed within said casing in longitudinally spaced relation, a single axially aligned combustion chamber and associated exhaust nozzle at one end of the casing, each of said propellant increments having individual ignition means connected in a control circuit, each ignition means being independently ignitable, means for isolating said propellant increments from adjacent increments, whereby the circuit can be preset to control the ignition of said propellant increments in one of a plurality of different selected sequences.

2. A variable-thrust solid propellant motor comprising an outer casing, a plurality of separate propellant increments disposed within said casing in longitudinally spaced relation, a single axially aligned combustion chamber and associated exhaust nozzle at one end of said casing, each of said propellant increments having individual ignition means, each ignition means being independently ignitable, separator means positioned in the spaces between said propellant increments for isolating adjacent increments, and variable means connecting said ignition means for controlling the ignition of said propellant increments in one of a plurality of different selected sequences immediately prior to firing.

3. The motor of claim 2 wherein said propellant increments have continuous bore openings coextensive with the common exhaust nozzle.

4. The motor of claim 2 wherein the separators are washer-shaped having an enlarged inner peripheral edge.

5. A variable-thrust solid propellant motor comprising an outer casing, a plurality of separate hollow tubular propellant increments disposed within said casing in longitudinally spaced relation, a single axially aligned combustion chamber and associated exhaust nozzle at one of said casing, each of said propellant increments having individual ignition squibs, a washer-like separator positioned in the spaces between said propellant increments for isolating adjacent increments, a layer of ignition inhibiting material applied to the bore surface of said propellant increments, an electrical control circuit for igniting said squibs, including a power source and a main ignition switch, a selector switch in said circuit connected to each of said squibs, whereby the firing sequence of said propellant increments may be preset.

6. The motor of claim 5 wherein said selector switch has a plurality of contacts connected to respective squibs, a corresponding number of movable contact arms, said contact arms being movable to energize a selected number of contacts corresponding to the total number of propellant increments to be ignited simultaneously.

7. The motor of claim 5 wherein said selector switch has a plurality of contacts connected to respective squibs, a single movable contact arm, and a timer for advancing said arm successively to energize said contacts in a predetermined sequence.

8. A variable-thrust solid propellant motor comprising an outer casing, a plurality of separate hollow tubular propellant increments disposed within said casing in longitudinally spaced relation, a single axially aligned combustion chamber and associated exhaust nozzle at one end of said casing, each of said propellant increments having individual ignition squibs, a washer-like separator positioned in the spaces between said propellant increments for isolating adjacent increments, an intermediate layer of ignition compound applied to the bore surface of each propellant increment, an outer layer of ignition inhibiting material applied over said first layer, said outer layer having an opening through which the squib extends to engage the layer of ignition compound, a control circuit for igniting said squibs including a power source and a main ignition switch, a selector switch in said circuit connected to each of said squibs, whereby the firing sequence of said propellant increments may be preset.

References Cited in the file of this patent

UNITED STATES PATENTS

| | | |
|---|---|---|
| 249,192 | Mallory | Nov. 8, 1881 |
| 2,114,214 | Damblanc | Apr. 12, 1938 |
| 2,395,435 | Thompson et al. | Feb. 26, 1946 |
| 2,724,237 | Hickman | Nov. 22, 1955 |
| 2,790,388 | MacLeod | Apr. 30, 1957 |
| 2,856,851 | Thomas | Oct. 21, 1958 |